United States Patent Office 3,524,062
Patented Aug. 11, 1970

3,524,062
APPARATUS FOR MEASURING THE MOISTURE CONTENT AND DENSITY OF THE SOIL
Jean Rocoplan, Sevres, Bernard Wack, Saint-Martin D'Heres, France, assignors to Electricite de France (Service National) Paris, France
Filed Mar. 15, 1968, Ser. No. 713,447
Claims priority, application France, Mar. 23, 1969, 100,108
Int. Cl. G01v 5/00
U.S. Cl. 250—83.1   6 Claims

ABSTRACT OF THE DISCLOSURE

This invention proposes a device for measuring the moisture content and density of a material, and particularly of a soil, said device comprises a source of fast neutrons and gamma rays and means for detecting neutrons and gamma rays which are transmitted through said material. Said source and said detection means are disposed on two opposite sides of the material. Said detection means comprise at least one neutron detector and one gamma-ray detector which are embedded in a same hydrogenated medium of predetermined volume.

---

The present invention relates to devices for measuring the moisture content of a volume of material by direct transmission of fast neutrons and more especially those which permit the combined measurement of density of the material.

A method of measurement of moisture content primarily intended for the measurement of soil moisture is described in a previous application, Pat. No. 3,428,806. The method described comprises the emission of a beam of fast neutrons on one side of the volume of said material and the selective detection on the opposite side of said volume of the neutrons which are transmitted directly through the material with the exception of scattered neutrons. The elimination of scattered neutrons is obtained by limiting the detection to neutrons whose energy is higher than a predetermined threshold, for example to thermal neutrons.

The determination of moisture content by weight usually entails a knowledge of the density of the material which is preferably measured by transmission of gamma rays through the same volume of material.

Said previous application also describes a device for practical application of said method which, in a preferred measuring the moisture content permit volume together with the density of the material, which comprises on each side of said material a source of fast neutrons and gamma rays and means for detecting neutrons and gamma rays which are transmitted through said material.

In the particular embodiment described, the detection means are made up of two symmetrical groups each comprising a neutron detector and a gamma ray detector which are independent of each other. The first of these two detectors is a slow neutron detector surrounded by a neutron-moderating volume and a shield which absorbs incident neutrons of thermal level. The two detectors are located in adjacent relation in a transverse plane relative to the mean direction of incident radiations emanating directly from the source. In addition, the gamma ray detector is distinctly smaller than the neutron detector and has a small useful area for detection of the gamma rays which are emitted by the source and transmitted directly through the material.

In consequence of the foregoing, the measurement volume is not the same both for neutrons and gamma rays, thereby impairing the accuracy of the final result by reason of the fact that the calculation of moisture content includes density and the calculator of density includes moisture content.

The essential object of the present invention is to overcome the disadvantages mentioned above by providing the same measurement volume in the case of both types of radiation. A further object of this addition is to secure freedom from any influence exerted by the chemical nature of the material examined, both in the case of density measurements and in the case of measurements of moisture content.

So far as the neutrons are concerned, the problem of influence of the chemical nature of the material has been solved in the device described in Pat. No. 3,428,806. This has been achieved by maintaining a minimum threshold of neutron detection. In this manner, it has been possible to eliminate the neutrons which are scattered by the material and consequently to ensure a predetermined measurement volume which is independent of the nature and moisture content of the material.

On the other hand, the practical value of the device referred-to is considerably reduced owing to the lack of precision of the density measurement. In fact, the gamma ray detector remains sensitive to gamma rays of very low energy which are derived from scattering within the material of the radiation emitted by the source as well as to external perturbing radiations.

Thus, the measurement volume to be considered for the measurement of density is not only small and different from the volume for the measurement of water content but varies in addition with the density of the material by reason of the influence of gamma rays of low energy. The measurement is partly affected by the chemical nature of the material. Moreover, it is necessary to carry out a preliminary measurement without any radioactive source in order to take into account the external spurious radiation and to correct the observed result.

The present invention makes it possible to overcome the different disadvantages explained in the foregoing by having recourse to a single medium which performs the function of scattering medium for the gamma rays received in the vicinity of the detector and of slowing-down medium for the neutrons.

This invention has for its object a device for measuring the moisture content and density of a material and particularly of a soil, said device comprising, disposed on each side of said material, a source of fast neutrons and gamma rays and means for detecting neutrons and gamma rays which are transmitted through said material, said device being essentially characterized in that said detection means comprise at least one neutron detector and one gamma-ray detector which are embedded in a same hydrogenated medium of predetermined volume.

According to a secondary feature, the hydrogenated medium is surrounded, at least in the direction of the incident rays which are transmitted or scattered through said material, by a shield for absorbing neutrons having energies below a predetermined threshold such as, for example, thermal neutrons.

According to another feature, said medium is surrounded by a shield which absorbs gamma rays of low energy such that the ratio of photoelectric cross-sections to the Compton cross-section is as small as possible and preferably smaller than 1% in the material under analysis. By virtue of the combined use of the hydrogenated medium and of the shields, the device according to the present invention accordingly makes it possible to improve the combined measurements of density and of water content to a considerable extent with respect to devices of the prior art. One noteworthy advantage of the device is that it ensures:

a substantial measurement volume in respect of a limited number of detectors, an identical measurement volume both for density and water content, the retention of energy domains, thereby avoiding the influence of the chemical nature of the material, small influence of external perturbing radiations.

By way of non-limitative example, there follows hereinafter a description of one particular embodiment of the device according to the invention which can be employed for determination of the density and water content of materials which provide in the natural state only one accessible face, said device being primarily intended for soil studies.

Reference is made in the description to FIGS. 1 to 3 of the accompanying drawings, in which.

Figure 1:
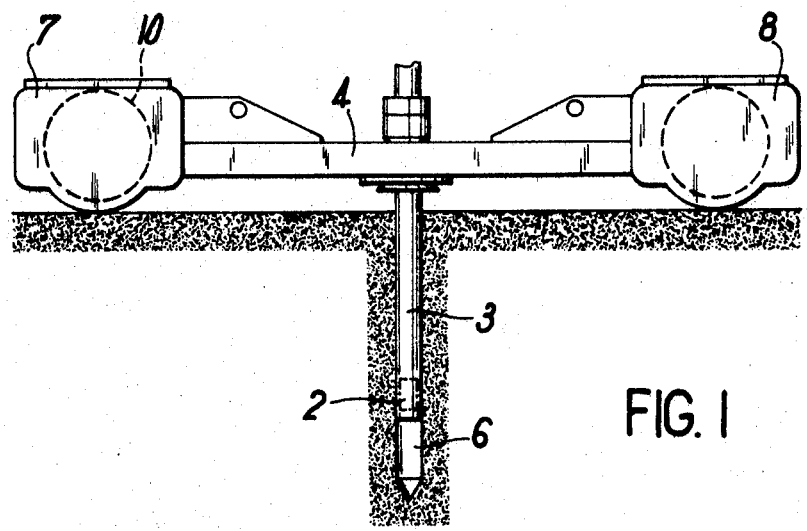
FIG. 1 is a diagrammatic view in elevation of the device herein described.

In the same manner as the apparatus described in Pat. No. 3,428,806, the device which is illustrated in FIG. 1 comprises a radiation source 2 carried by the extremity of a rod 3 which is driven into the ground. The source 2 which is constituted, for example, by cesium–137 and a mixture of americium and beryllium emits on the one hand gamma rays and, on the other hand, fast neutrons.

The rod 3 is mounted on a platform 4 which is placed above the ground and parallel to the surface of this latter at the time of measurements. The rod is perpendicular to the platform and is capable of sliding within this latter; it can thus be driven into a well 6 which has previously been drilled in the ground and fitted with a guide tube. The source is usually inserted to a depth which can vary between 20 and 40 centimeters.

The platform 4 is additionally designed to carry two casings 7 and 8 which are symmetrical with respect to the 3 and each contain a detection probe 10 which is sensitive to neutrons and to gamma rays transmitted through the material from the source. This arrangement makes it possible to double the volume of the measurements and to constitute a reference plane for maintaining constancy of thickness (or depth) of the soil under analysis. The global result is determined according to the mean value of radiations detected by both probes.

Figure 2:
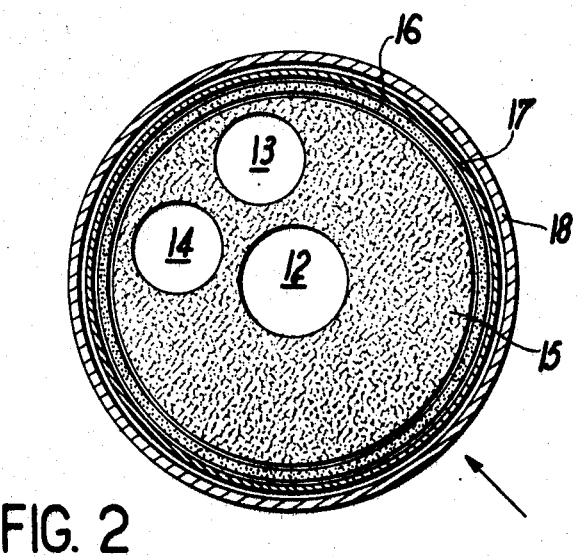
FIG. 2 is a diagrammatic transverse sectional view of the detection probe which is employed.
Figure 3:
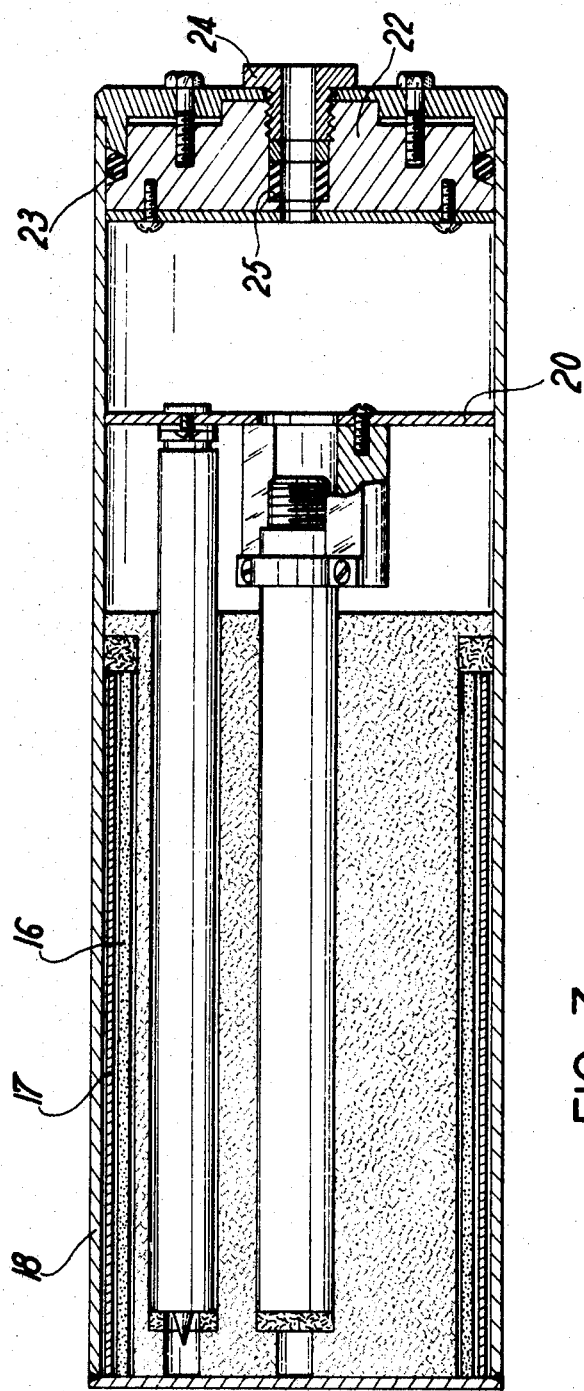
FIG. 3 is a longitudinal sectional view of said probe.

As shown in FIGS. 2 and 3, each probe 10 comprises a neutron detector 12 and two gamma-ray detectors 13 and 14, all three of which are embedded in a hydrogenated medium 15. Said medium reacts with the neutrons and gamma rays which reach this latter and causes the slowing-down of said neutrons and the scattering of said gamma rays. In the particular case herein described, said medium is constituted by a cylindrical block of paraffin-wax in which are formed cavities for accommodating the detectors.

The hydrogenated medium 15 is surrounded by a first shiend 16 which absorbs the low-energy gamma rays and a second shield 17 which absorbs the low-energy neutrons. The complete assembly is contained within a cylindrical casing 18. The three detectors are removably fixed on a disc 20 which is slidably mounted inside the cylindrical casing 18.

Once the detectors are placed in position in the hydrogenated medium 15, the cylindrical casing 18 is sealed off by a plug 22 which serves to clamp a seal 23, thereby ensuring leak-tightness. Said plug is fitted with an axial bushing 24 which permits the insertion of a flexible tube containing the lead-in wires which come from the detectors and serve to transmit the indications from these latter to amplification and counting units (not shown in the drawings). When clamped in position, the bushing 24 serves to compress a seal 25 against the flexible tube.

Generally speaking, the number and types of neutron and gamma ray detectors, their relative arrangement and the thickness of the hydrogenated scattering and slowing-down medium are chosen correlatively in such a manner as to ensure that said medium performs its intended function with maximum effectiveness with respect to the two types of radiation.

So far as the gamma rays are concerned, the hydrogneated medium constitutes a scattering medium which gives rise to Compton scattering processes and serves to return the scattered rays in the direction of the detectors 13 and 14. In consequence, said medium makes it possible to count a part of the gamma rays which penetrate into the scattering medium but which are not initially directed towards the detectors. In fact, said gamma rays which would normally escape from detection by the detectors 13 and 14 accordingly interact with the electrons of the scattering medium whilst the secondary scattered rays of lower energy which are emitted in different directions (essentially in acute angles and in a forward direction with respect to the direction of the incident radiation) can impinge upon the detectors. Were said scattering medium not present, the gamma rays would not impinge upon the wall of the detectors and could not be detected.

The thickness and the nature of the scattering medium depend on the sensitivity of the detectors to gamma rays of different energies, on their geometrical shape and on their volume, and are chosen:

to permit maximum production of scattered rays in the direction of the detectors, to prevent absorption of useful gamma rays by photoelectric effect, to stop incident rays of very low energy, whether these latter are generated by scattering within the soil or whether they are derived from external perturbing radiations.

In order to ensure good scattering of the gamma rays, the scattering medium must contain the maximum number of electrons per cubic centimeter, these electrons being bound as weakly as possible to the atoms to which they belong. This condition is particularly well satisfied by hydrogen. This latter can be employed either in the form of hydrogen gas under pressure, for example a pressure of the order of 10 atmospheres, or in combined form in a liquid, solid or gaseous medium.

In order to prevent any photoelectric effect involving the useful gamma rays and in order to ensure substantial freedom of the electrons, the elements which may be present in the scattering medium conjointly with hydrogen should preferably have an atomic number which is as small as possible and below 10, for example.

By way of liquid or solid scattering medium which is easier to use than gaseous hydrogen, use can advantageously be made of compounds in which the number of electrons per cubic centimeter is at least equal to that of water and containing between 25% and 10% hydrogen and between 75% and 90% of other light atoms having an atomic number smaller than 10. These conditions correspond in practice to certain highly hydrogenated and very pure solids or liquids such as water, paraffin, saturated hydrocarbons such as hexane, plastic materials and so forth.

The thickness of the scattering medium depends on the geometry of the probe as well as on the number and type of gamma detectors employed, and in particular on their sensitivity as a function of energy. Preferably, the thickness of the scattering medium is such that one-half of the incident gamma rays are subjected thereto in to a Compton interaction.

The gamma detectors can be constituted, for example, by ionization chambers, Geiger-Muller counters, scintillation counters, junction detectors, and so forth.

In accordance with the particular embodiment herein described, it is particularly advantageous to provide two counters in the scattering medium in such a manner as to increase the detection area within this latter. Said detectors are disposed beyond the center of the scattering medium, symmetrically with respect to the direction of the incident gamma rays in order to receive the maximum quantity of scattered rays, these latter being directed forwards within the assembly with respect to the direction of the incident radiation as materialized by an arrow in FIG. 2.

The gamma scattering medium which is selected as a function of the criteria set forth above plays at the same time the part of slowing-down medium for the neutrons by reason of the large cross-section for elastic collision of hydrogen.

In order to perform this function completely, the above-mentioned gamma scattering medium must contain the minimum number of atoms having a high absorption cross-section, which would reduce the sensitivity of detection, and the minimum number of atoms which are capable of capturing the neutrons and of producing extraneous radiation which might influence the gamma ray detectors. The elements to be avoided are, in particular, iodine, cadmium, cobalt, boron lithium, beryllium.

The arrangement of the neutron detector in the slowing-down medium is a function of the nature of this latter and of the detection threshold of the detector or, in a general manner of its sensitivity to the different neutron energies.

If use is made of a slow-neutron detector such as, for example, a boron fluoride detector, the slowing-down medium must be capable of producing therein a slowing-down action which is such that the energy of the incident neutrons is reduced to the detection threshold of the detector, without thereby decreasing to an excessive degree the thermal neutron field intensity in the vicinity of the detector.

Should the detector be additionally sensitive to fast neutrons, as is the case with a helium detector 3, the slowing-down medium nevertheless makes it possible to improve the response curve of the detector, to promote detection of neutrons within a predetermined energy band, to enhance the sensitivity of detection and to increase the measurement volume.

The combined use of two shields 16 and 17 which surround the scattering and slowing-down medium makes it possible to retain the radiations derived from the scattering in the soil of neutrons and gamma rays emitted by the source, with the result that the detection is limited to the neutrons and gamma rays which are transmitted directly through the soil between the source and the detection probe. A predetermined and constant measurement volume is thus ensured and any influence which the chemical nature of the soil under analysis might otherwise have on the results is thereby eliminated.

The shield 16 is formed of lead or any other material having a high photoelectric absorption cross-section for low-energy gamma rays corresponding to the rays which are scattered within the soil. Heavy atoms such as lead, uranium, tungsten, zinc are suitable for the purpose.

The shield 17 is fabricated from cadmium, nidium or from any other material which has a high absorption cross-section for neutrons but in which the absorption does not give rise to secondary radiation which is liable to be captured. The purpose of the shield is to retain all the neutrons of low energy which correspond to scattered neutrons in the soil.

The thickness of each shield is determined so as not to reduce the gamma and neutron detection sensitivities while at the same time providing adequate protection.

In a particular example of construction, a helium detector 3 which was sensitive to slow neutrons and to fast neutrons was disposed substantially at the center of a paraffin-wax cylinder which constituted the scattering and slowing-down medium and, as shown in FIG. 2, two halogen detectors were placed behind the neutron detector, symmetrically with respect to the direction of incident radiations derived from the source. The source was composed of 10 millicuries of cesium-137 and 300 millicuries of americium-beryllium.

The paraffin-wax cylinder, 4.5 centimeters in radius, was surrounded by a lead shield 2 millimeters in thickness and by a cadium shield 1 millimeter in thickness. The lead shield was placed between the cadium and the paraffin wax, the effect thereby achieved being to stop to a partial extent the gamma rays emitted at the level of the caduim shield at the time of absorption of thermal neutrons.

As is apparent, the invention is not limited in any sense to the particular form of construction which has been described above by way of example but extends, on the contrary, to all alternative forms. In particular, provision may be made for any desired number of detectors. In some alternative embodiments, the source and the detection means are contained in two separate probes introduced separately in the ground. Similarly, the invention extends to any application other than soil tests and studies, and especially to the measurement of the water content of seeds or of bulk materials. The practical operation of this method is facilitated when the materials being analyzed provide in the natural state two accessible faces.

What we claim is:

1. A device for measuring the moisture content and density of a material comprising a source of fast neutrons and gamma rays and means for detecting neutrons and gamma rays which are transmitted through said material said source and said detection means being disposed two opposite on sides of said material and said detection means comprising a neutron detector and a gamma-ray detector which are embedded in a same hydrogenated medium wherein said medium is covered by a first shield for absorbing neutrons having energies below the threshold of thermal neutrons and by a second shield for absorbing high energy gamma rays.

2. A device in accordance with claim 1, wherein said neutron-absorbing shield is made of cadmium.

3. A device in accordance with claim 1, wherein said gamma-ray absorbing shield is disposed between said hydrogenated medium and said neutron-absorbing shield.

4. A device in accordance with claim 1, wherein said hydrogenated medium contains two gamma-ray detectors disposed symmetrically with respect to the main direction of the incident radiation beyond the center of the hydrogenated medium with respect to said incident radiation.

5. A device in accordance with claim 1, wherein said neutron detector is disposed substantially at the center of said hydrogenated medium.

6. A device in accordance with claim 1, wherein said device comprises a source-carrying rod slidably mounted on a platform provided with two casings for accommodating detection means which are disposed symmetrically with respect to said rod.

References Cited

UNITED STATES PATENTS 3,428,806  2/1969  Wack _____ 250—83.1

RALPH G. NILSON, Primary Examiner

M. J. FROME, Assistant Examiner

U.S. Cl. X.R.

250—83.3, 83.6